United States Patent
Kline (10) Patent No.: US 11,499,815 B2
(45) Date of Patent: Nov. 15, 2022

(54) VISUAL QUALITY ASSESSMENT AUGMENTATION EMPLOYING HOLOGRAPHIC INTERFEROMETRY

(71) Applicant: INTERNATIONAL BUSINESS MACHINES CORPORATION, Armonk, NY (US)

(72) Inventor: Eric V. Kline, Pine Island, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 106 days.

(21) Appl. No.: 17/114,548

(22) Filed: Dec. 8, 2020

(65) Prior Publication Data
US 2022/0178676 A1 Jun. 9, 2022

(51) Int. Cl.
| G01B 9/021 | (2006.01) |
| G03H 1/22 | (2006.01) |
| G03H 1/00 | (2006.01) |
| G01B 9/02 | (2022.01) |
| G03H 1/04 | (2006.01) |

(52) U.S. Cl.
CPC ......... G01B 9/021 (2013.01); G01B 9/02085 (2013.01); G03H 1/0005 (2013.01); G03H 1/0443 (2013.01); G03H 1/2294 (2013.01); G03H 2001/0033 (2013.01)

(58) Field of Classification Search
CPC .. G01B 9/0207; G01B 9/02085; G01B 9/021; G03H 1/0005; G03H 2001/0033; G03H 1/0443
See application file for complete search history.

(56) References Cited

U.S. PATENT DOCUMENTS

| 3,723,010 | A | * | 3/1973 | McCrickered | ......... | G01B 9/021 359/24 |
| 3,764,216 | A | | 10/1973 | Bliek et al. | | |
| 3,860,346 | A | | 1/1975 | Kersch et al. | | |

(Continued)

FOREIGN PATENT DOCUMENTS

| DE | 4235618 A1 | 4/1994 | |
| DE | 19935631 C1 * | 4/2001 | ............. G01J 11/00 |

(Continued)

OTHER PUBLICATIONS

Osten, Wolfgang et al. "Comparative digital holography". Optics Letters, vol. 27, No. 20, Oct. 15, 2002, pp. 1764-1766. (Year: 2002).*
Baumbach, Torsten et al. "Remote metrology by comparative digital holography". Applied Optics, vol. 45, No. 5, Feb. 10, 2006, pp. 925-934. (Year: 2006).*
Akrometrix "Shadow Moire Flatness Measurement and Analysis Technique", by Akrometrix LLC, Thermal Warpage & Strain Metrology, retrieved at: http://akrometrix.com/products/measurement-techniques/shadow-moire/; downloaded Nov. 6, 2020; 2 pgs.

(Continued)

*Primary Examiner* — Michael A Lyons
(74) *Attorney, Agent, or Firm* — Cantor Colburn LLP; Tihon Poltavets (57) ABSTRACT

Methods, systems and computer program products for performing visual quality assessment using holographic interferometry are provided. Aspects include obtaining a reference holographic pattern based on a reference object and obtaining a test holographic pattern based on a test object. Aspects also include creating an interference pattern by superimposing the test holographic pattern onto the reference holographic pattern. Aspects further include determining a difference between the reference object and the test object based upon the interference pattern.

18 Claims, 6 Drawing Sheets

(56) References Cited

U.S. PATENT DOCUMENTS

| | | | |
|---|---|---|---|
| 4,464,052 A * | 8/1984 | Neumann | G01B 9/021 356/458 |
| 4,807,996 A * | 2/1989 | Ginnis | G01B 9/021 73/656 |
| 5,408,305 A | 4/1995 | Webster et al. | |
| 5,754,318 A * | 5/1998 | Agopian | G03H 1/26 359/10 |
| 6,094,260 A | 7/2000 | Rockstroh et al. | |
| 7,649,160 B2 | 1/2010 | Colomb et al. | |
| 10,025,271 B2 | 7/2018 | Mathuis et al. | |
| 2002/0149778 A1 | 10/2002 | Straehle | |
| 2013/0301093 A1 * | 11/2013 | Awatsuji | G03H 1/0443 359/22 |
| 2017/0277123 A1 * | 9/2017 | Yasuda | G03H 1/30 |
| 2018/0348703 A1 | 12/2018 | Furman | |

FOREIGN PATENT DOCUMENTS

| | | |
|---|---|---|
| EP | 2541192 A1 | 1/2013 |
| JP | 58120101 A | 7/1983 |
| JP | H0694432 * | 4/1994 |

OTHER PUBLICATIONS

Mell, Peter et al. "The NIST Definition of Cloud Computing" NIST National Institute of Standards and Technology, U.S. Department of Commerce, Special Publication 800-145; dated Sep. 2011, 7 pgs.

Wikipedia "Holographic interferometry", retrieved at: https://en.wikipedia.org/wiki/Holographic_interferometry; downloaded Nov. 6, 2020, 5 pgs.

Anan Asundi, Visual and optical testing (VT/OT)/Holography, ndt.net, Apr. 16, 2022, available at: https://www.ndt/ndtaz/content.php?id-621{retrieved on May 16, 2022}.

International Search Report; International Application No. GB2116847.1; International Filing Date: Nov. 23, 2021; datedMay 19, 2022; 7 pages.

Kreis et al., "Neural network approach to holographic nondestructive testing", Applied Optics, 34, 8, (1995), abstrack available at: https://opg.optoca.org/ao/abstract.cfm?URI=ao-34-8-1407{retrieved on May 17, 2022}.

* cited by examiner

VISUAL QUALITY ASSESSMENT AUGMENTATION EMPLOYING HOLOGRAPHIC INTERFEROMETRY

BACKGROUND

The invention relates generally to visual quality assessments and, more specifically, to visual quality assessment augmentation employing holographic interferometry.

Manufacturers often require a visual inspection of a manufactured object to ensure the quality of object is with a desired fault tolerance. Currently, various artificial intelligence (AI) vision-based systems are used to perform these visual assessments. These tools employ visual model training of a neural networks to perform object detection and image classification operations on visual data, such as still photo and/or videos. Performing these operations on optical data requires a very large amount of computing resources, such as memory, CPU & GPU cycles, etc.

SUMMARY

According to an embodiment, a system for performing visual quality assessment using holographic interferometry is provided. The system includes a memory having computer readable computer instructions, and a processor for executing the computer readable instructions. The computer readable instructions include instructions for obtaining a reference holographic pattern based on a reference object and obtaining a test holographic pattern based on a test object. The method also includes creating an interference pattern by superimposing the test holographic pattern onto the reference holographic pattern. The method further includes determining a difference between the reference object and the test object based upon the interference pattern.

According to another embodiment, a method for performing visual quality assessment using holographic interferometry is provided. The method includes obtaining a reference holographic pattern based on a reference object and obtaining a test holographic pattern based on a test object. The method also includes creating an interference pattern by superimposing the test holographic pattern onto the reference holographic pattern. The method further includes determining a difference between the reference object and the test object based upon the interference pattern.

According to a further embodiment, a computer program product is provided. The computer program product includes a computer readable storage medium having program instructions embodied therewith. The computer readable storage medium is not a transitory signal per se. The program instructions are executable by a computer processor to cause the computer processor to perform a method. The method includes obtaining a reference holographic pattern based on a reference object and obtaining a test holographic pattern based on a test object. The method also includes creating an interference pattern by superimposing the test holographic pattern onto the reference holographic pattern. The method further includes determining a difference between the reference object and the test object based upon the interference pattern.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings, in which:

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist, on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist, on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
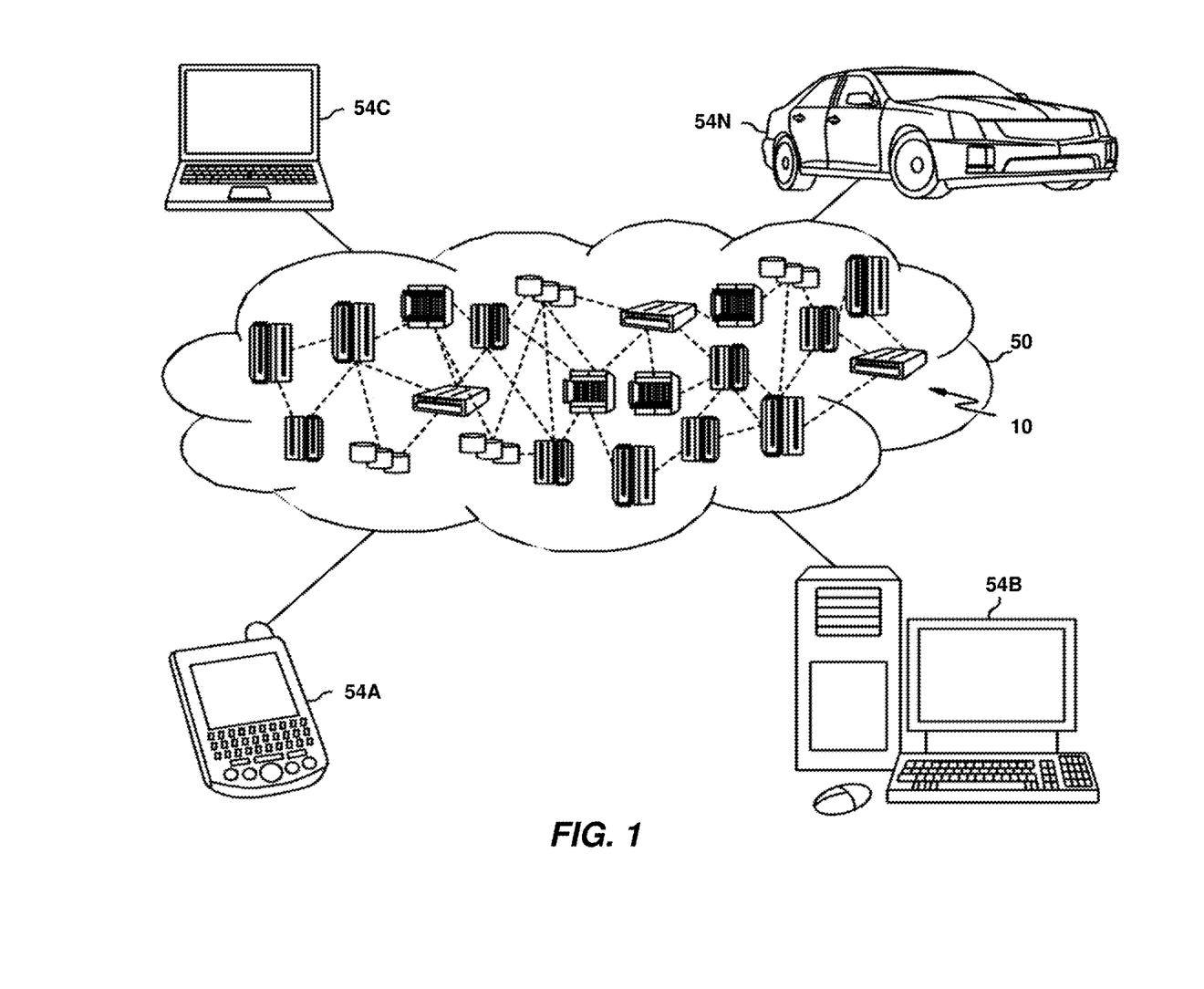
FIG. 1 depicts a cloud computing environment according to one or more embodiments of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
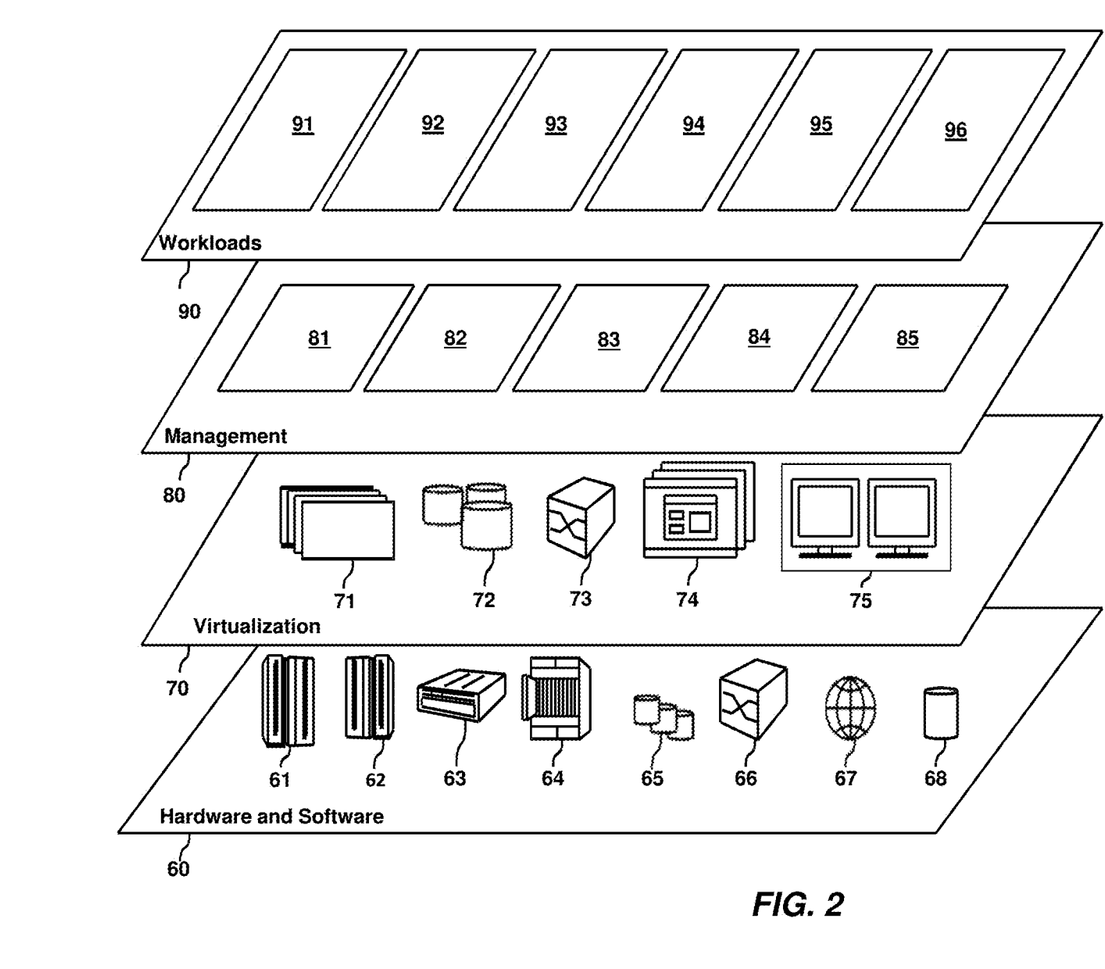
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and performing visual quality assessment using holographic interferometry 96.

Figure 3:
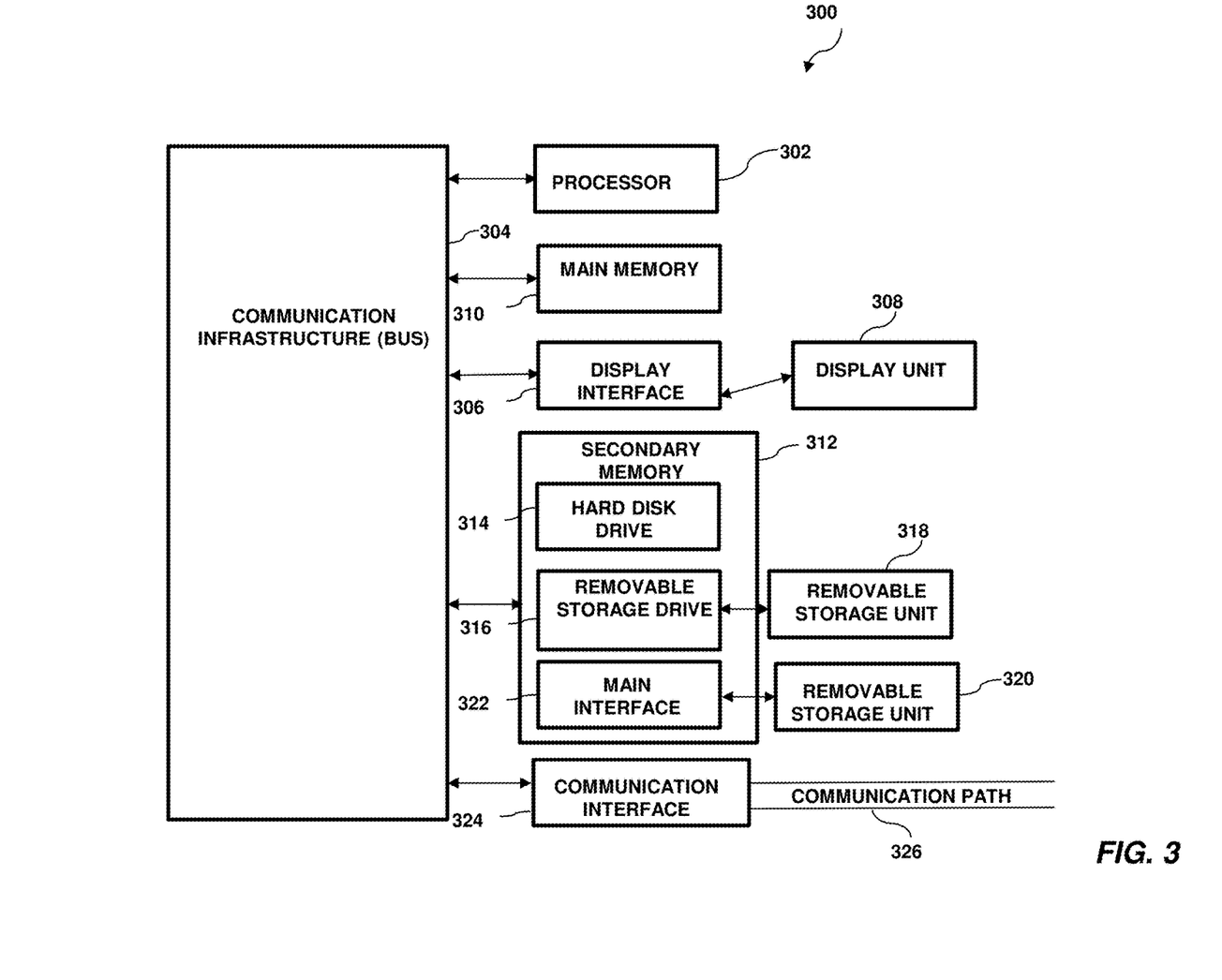
FIG. 3 depicts an exemplary computer system capable of implementing one or more embodiments of the present invention.

Turning now to a more detailed description of aspects of the present invention, FIG. 3 illustrates a high-level block diagram showing an example of a computer-based system 300 useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional systems are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by a removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etc. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

In general, holography is a process of recording a diffracted light field scattered from an object. A recorded diffracted light field, also referred to herein as a holographic pattern, from one object will be identical to the holographic pattern from an identical object. If, however, a small deformation or change is applied to one of the objects, the relative phases of the two light fields will alter, and it is possible to observe interference by superimposing the two holographic patterns. This technique is referred to herein as holographic interferometry.

In exemplary embodiments, methods, systems, and computer program products for performing visual quality assessment using holographic interferometry are provided. In exemplary embodiments, a visual quality assessment of a test object is performed using holographic interferometry to compare a holographic pattern of the test object to a holographic pattern of a reference object. The holographic patterns are superimposed to create an interference pattern that is analyzed to determine a difference between the reference object and the test object.

Figure 4:
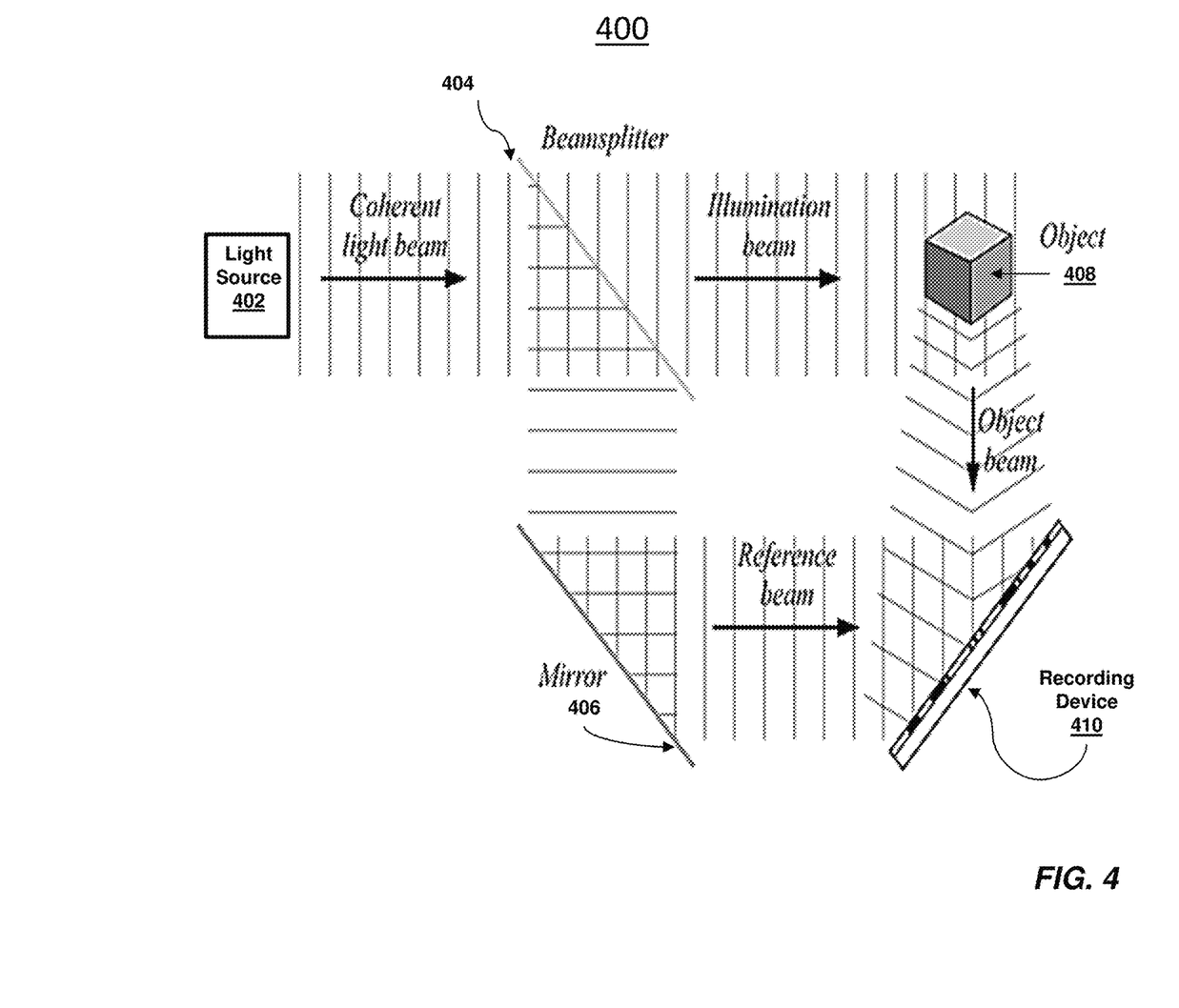
FIG. 4 depicts a schematic of a system for capturing a holographic pattern of an object according to one or more embodiments of the present invention.

Turning now to FIG. 4, a system 400 for capturing a holographic pattern of an object will now be described in accordance with an embodiment. The system 400 shown in FIG. 4 includes a light source 402 that emits a coherent light beam. The light source 402 may emit monochromatic or spread-spectrum light. The light beam impacts a beam splitter 404 which splits the light beam into an illumination beam and a reference beam. The illumination beam is directed towards an object 408 and the reference beam is directed towards a mirror 406. The illumination beam impacts the object and creates an object beam that is directed to a recording device 410. The reference beam is also directed to the recording device 410 by the mirror 406. In exemplary embodiments, the recording device 410 is one of a photographic plate and a digital sensor array. As will be understood by those of ordinary skill in the art, the system 400 depicts one system for capturing a holographic pattern of an object and other systems may be used for capturing a holographic pattern of an object.

Figure 5:
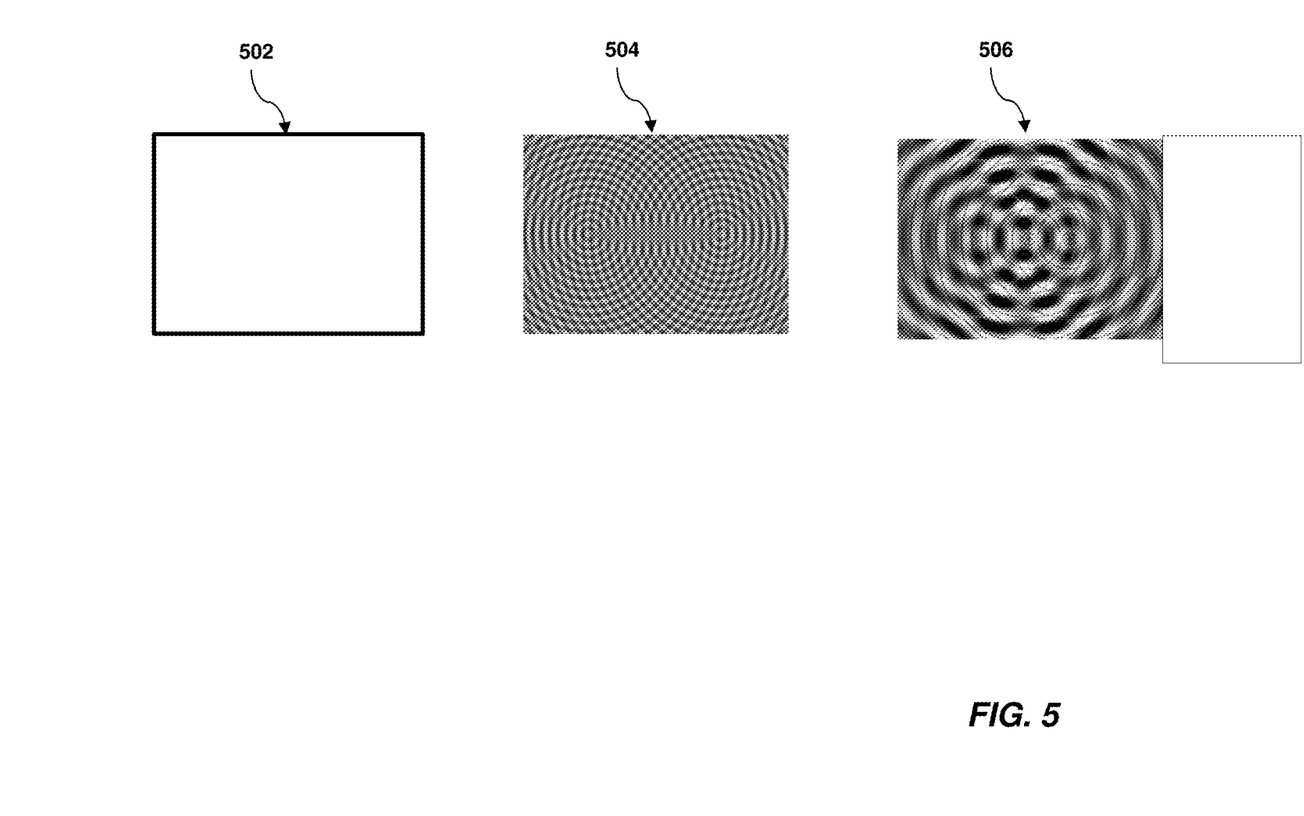
FIG. 5 depicts illustrations of various interference patterns according to one or more embodiments of the present invention.

In exemplary embodiments, once a holographic pattern of a reference object and a test object are obtained, the holographic pattern of a reference object is superimposed on the holographic pattern of the test object to create an interference pattern. FIG. 5 depicts illustrations of various interference patterns 502, 504, and 506 according to one or more embodiments of the present invention. The first interference pattern 502 illustrates the superimposition of holographic patterns for two identical objects. The second interference patterns 504 illustrates the superimposition of holographic patterns for two objects that have a high degree of difference between them. The third interference pattern 506 illustrates the superimposition of the holographic pattern for two objects that have a moderate degree of difference between them. In exemplary embodiments, various techniques may be used to analyze an interference pattern to quantify the difference between the two objects used to create the interference pattern. In one embodiment, the difference between the two objects is negatively correlated with the amount of whitespace present in the interference pattern. For example, an interference pattern with 100% whitespace will represent identical objects and as the amount of whitespace in the interference pattern decreases, the difference between the two objects increases.

Figure 6:
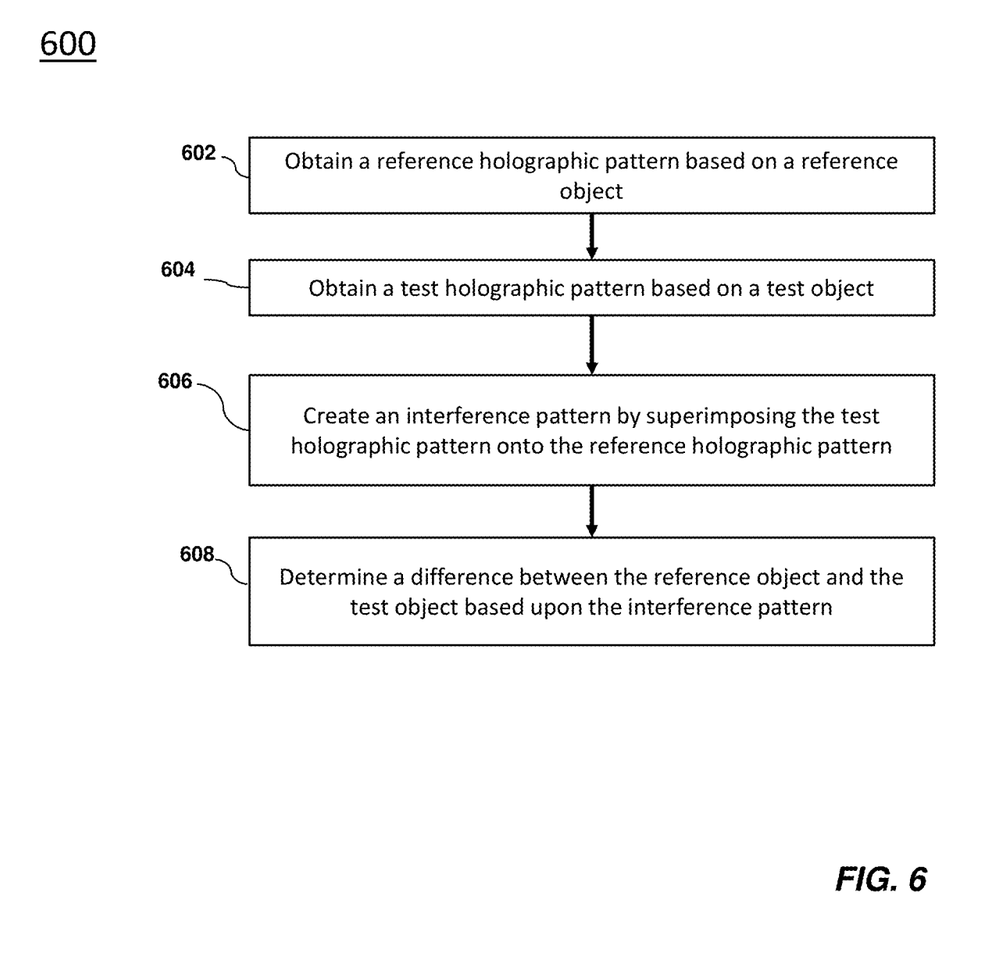
FIG. 6 depicts a flow diagram of a method for performing visual quality assessment using holographic interferometry according to one or more embodiments of the present invention.

Turning now to FIG. 6, a flow diagram of a method 600 for performing visual quality assessment using holographic interferometry in accordance with an embodiment is shown. The method 600 begins at block 602 by obtaining a reference holographic pattern based on a reference object. In exemplary embodiments, the reference holographic pattern is obtained by applying digital holography to the reference object. Next, as shown at block 604, the method 600 includes obtaining a test holographic pattern based on a test object. In exemplary embodiments, the test holographic pattern is obtained by applying digital holography to the test object.

The method 600 also includes creating an interference pattern by superimposing the test holographic pattern onto the reference holographic pattern, as shown at block 606. Next, as shown at block 608, the method 600 includes determining a difference between the reference object and the test object based upon the interference pattern. In one embodiment, determining the difference between the reference object and the test object includes performing a binomial detection of a presence of data in the interference pattern. In another embodiment, determining the difference between the reference object and the test object includes analyzing the interference pattern and assigning a score to the interference pattern based on the analysis, where a score of zero indicates the absence of data in the interference pattern. In one embodiment, the score is determined to be one hundred minus the percentage of whitespace in the interference pattern. In other embodiments, the score is determined using a trained neural network.

In exemplary embodiments, the method includes determining that the difference is less than an acceptable tolerance based on the score being below a first value. In other words, the method determines that the test object is sufficiently similar to the reference object to fall with an acceptable tolerance level based on the score being below a first value. In exemplary embodiments, the method includes determining that the difference is greater than acceptable tolerance based on the score being above a second value. In other words, the method determines that the test object is too different from the reference object to fall with an acceptable tolerance level based on the score being above a first value. In exemplary embodiments, if the score is above the first value and below the second value the method includes flagging the test object for additional inspection. In other words, the method determines that the test object is not similar enough to the reference object to be within the acceptable tolerance and not different enough to be disqualified from falling within the acceptable tolerance level. In exemplary embodiments, the additional inspection may employ more computationally intensive vision-based tools, such as Visual Inspector (VI) and Power AI Vision (PAIV) made by IBM.

In exemplary embodiments, the interference pattern created by superimposing the test holographic pattern onto the reference holographic pattern is analyzing using a neural network that is configured to assigning the score to the interference pattern. The neural network is trained based on a plurality of interference patterns representing associated degrees of non-conformance between the reference object and control objects.

In exemplary embodiments, the method for performing visual quality assessment using holographic interferometry can be used to perform a visual quality assessment on any object. These objects can include any high precision objects, such as internal parts of an engine, portions of semiconductors, medical devices, or the like.

In exemplary embodiments, holographic interferometry is employed digitally, by creating a digital holographic pattern from a reference object and superimposing diffracted light from a test object on to the digital holographic pattern. If the test object is identical to the reference object, then no interference pattern is observed. If the test object is with an acceptable fault tolerance to the reference object, then a score assigned to the interference pattern will be less than a threshold value. Likewise, if the test object is not with an acceptable fault tolerance to the reference object then a score assigned to the interference pattern will be greater than a threshold value. In one embodiment, the mere presence or lack thereof of an interference pattern is a simple, rapid, and inexpensive means to assess the attribute of visual similitude between the two objects (i.e., requiring less computational resources that existing AI visual-based tools). Accordingly, in one embodiment, a simple binomial detection of the presence or absence of an interference pattern is used to determine a difference between the reference object and the test object.

Technical benefits include an improved functionality of computer systems that are able to perform a visual quality assessment using holographic interferometry. In one embodiment, the computational resources required to perform the visual quality assessment are significantly reduced as compared to traditional artificial intelligence (AI) visual inspection systems due to the user of holographic interferometry.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for performing visual quality assessment using holographic interferometry comprising:
    obtaining, by a processor, a reference holographic pattern based on a reference object;
    obtaining, by the processor, a test holographic pattern based on a test object;
    creating, by the processor, an interference pattern by superimposing the test holographic pattern onto the reference holographic pattern; and
    determining, by the processor, a difference between the reference object and the test object by analyzing the interference pattern and assigning a score to the interference pattern based on the analysis,
    wherein the interference pattern is analyzed using a neural network that is configured to assign the score to the interference pattern, wherein the neural network is trained based on a plurality of interference patterns representing associated degrees of non-conformance between the reference object and control objects.

2. The method of claim 1, wherein the reference holographic pattern is obtained by digital holographic interferometry to the reference object.

3. The method of claim 1, wherein the test holographic pattern is obtained by applying digital holographic interferometry to the test object.

4. The method of claim 1, wherein determining the difference between the reference object and the test object includes performing a binomial detection of a presence of data in the interference pattern.

5. The method of claim 1, wherein a score of zero indicates the absence of data in the interference pattern.

6. The method of claim 5, further comprising determining that the difference is less than an acceptable tolerance based on the score being below a first value and determining that the difference is greater than the acceptable tolerance based on the score being above a second value.

7. The method of claim 6, further comprising flagging the test object for additional inspection based on the score being above the first value and below the second value.

8. A system for performing visual quality assessment using holographic interferometry, comprising:
    a memory having computer readable instructions; and
    a processor for executing the computer readable instructions, the computer readable instructions including instructions for:
        obtaining a reference holographic pattern based on a reference object;
        obtaining a test holographic pattern based on a test object;
        creating an interference pattern by superimposing the test holographic pattern onto the reference holographic pattern; and
        determining a difference between the reference object and the test object by analyzing the interference pattern and assigning a score to the interference pattern based on the analysis,
    wherein the interference pattern is analyzed using a neural network that is configured to assign the score to the interference pattern, wherein the neural network is trained based on a plurality of interference patterns representing associated degrees of non-conformance between the reference object and control objects.

9. The system of claim 8, wherein the reference holographic pattern is obtained by digital holographic interferometry to the reference object.

10. The system of claim 8, wherein the test holographic pattern is obtained by applying digital holographic interferometry to the test object.

11. The system of claim 8, wherein determining the difference between the reference object and the test object includes performing a binomial detection of a presence of data in the interference pattern.

12. The system of claim 8, wherein a score of zero indicates the absence of data in the interference pattern.

13. The system of claim 12, wherein the computer readable instructions further include instruction for determining that the difference is less than an acceptable tolerance based on the score being below a first value and determining that the difference is greater than the acceptable tolerance based on the score being above a second value.

14. The system of claim 13, wherein the computer readable instructions further include instruction for flagging the test object for additional inspection based on the score being above the first value and below the second value.

15. A computer program product comprising a computer readable storage medium having program instructions embodied therewith, the program instructions executable by a computer processor to cause the computer processor to perform a method, comprising:
    obtaining a reference holographic pattern based on a reference object;
    obtaining a test holographic pattern based on a test object;
    creating an interference pattern by superimposing the test holographic pattern onto the reference holographic pattern; and
    determining a difference between the reference object and the test object by analyzing the interference pattern and assigning a score to the interference pattern based on the analysis,
    wherein the interference pattern is analyzed using a neural network that is configured to assign the score to the interference pattern, wherein the neural network is trained based on a plurality of interference patterns representing associated degrees of non-conformance between the reference object and control objects.

16. The computer program product of claim 15, wherein the reference holographic pattern is obtained by digital holographic interferometry to the reference object.

17. The computer program product of claim 15, wherein the test holographic pattern is obtained by applying digital holographic interferometry to the test object.

18. The computer program product of claim 15, wherein determining the difference between the reference object and the test object includes performing a binomial detection of a presence of data in the interference pattern.

\* \* \* \* \*